(12) United States Patent
Puzio et al.

(10) Patent No.: US 7,594,548 B1
(45) Date of Patent: Sep. 29, 2009

(54) POWER TOOL HAVING A JOYSTICK CONTROL

(75) Inventors: Daniel Puzio, Baltimore, MD (US); James B. Watson, Fallston, MD (US)

(73) Assignee: Black & Decker Inc., Newark, DE (US)

( * ) Notice: Subject to any disclaimer, the term of this patent is extended or adjusted under 35 U.S.C. 154(b) by 4 days.

(21) Appl. No.: 11/828,766

(22) Filed: Jul. 26, 2007

Related U.S. Application Data

(60) Provisional application No. 60/820,351, filed on Jul. 26, 2006.

(51) Int. Cl.
*B25B 23/147* (2006.01)

(52) U.S. Cl. .................. 173/20; 173/217; 173/171; 173/170

(58) Field of Classification Search .......... 173/217, 173/171, 170, 20
See application file for complete search history.

(56) References Cited

U.S. PATENT DOCUMENTS

| | | | | |
|---|---|---|---|---|
| 3,752,241 A * | 8/1973 | Bent | ........................... | 173/221 |
| 4,050,526 A * | 9/1977 | Deike | ........................... | 173/27 |
| 4,271,909 A * | 6/1981 | Chatfield et al. | .............. | 169/70 |
| 4,637,475 A * | 1/1987 | England et al. | ............. | 173/193 |
| 5,007,573 A * | 4/1991 | Uuskallio | ................... | 227/139 |
| 5,094,302 A * | 3/1992 | Back | ........................... | 173/28 |
| 5,271,543 A * | 12/1993 | Grant et al. | .............. | 227/179.1 |
| 5,277,261 A * | 1/1994 | Sakoh | ........................ | 173/176 |
| 5,363,925 A * | 11/1994 | Gallagher | .................. | 173/186 |
| 5,451,127 A * | 9/1995 | Chung | ........................ | 408/20 |
| 5,638,945 A * | 6/1997 | Fukinuki et al. | ......... | 200/43.17 |
| 6,026,871 A * | 2/2000 | Chapman | .................. | 144/356 |
| 6,079,506 A * | 6/2000 | Mercer | ........................ | 175/45 |
| 6,085,846 A * | 7/2000 | Buchl et al. | ................... | 172/4 |
| 6,164,385 A * | 12/2000 | Buchl | ......................... | 172/239 |
| 6,213,879 B1 * | 4/2001 | Niizuma et al. | ............... | 463/36 |
| 6,213,880 B1 * | 4/2001 | Sim | ........................... | 463/37 |
| 6,220,964 B1 * | 4/2001 | Miyamoto et al. | ........... | 463/43 |
| 6,229,526 B1 * | 5/2001 | Berstis | ........................ | 345/158 |
| 6,241,611 B1 * | 6/2001 | Takeda et al. | ................ | 463/38 |
| 6,293,359 B1 * | 9/2001 | Dobran et al. | ............. | 175/195 |
| 6,305,480 B1 * | 10/2001 | Franklin | ..................... | 173/27 |
| 6,443,973 B1 * | 9/2002 | Whitman | .................... | 606/219 |
| 6,536,536 B1 * | 3/2003 | Gass et al. | ..................... | 173/2 |
| 6,550,546 B2 * | 4/2003 | Thurler et al. | ................ | 173/48 |
| 6,752,221 B1 * | 6/2004 | Morissette | .................. | 173/38 |
| 6,758,291 B1 * | 7/2004 | Koch | ........................... | 180/11 |
| 6,845,825 B2 * | 1/2005 | Bischel et al. | ............... | 175/24 |
| 6,948,398 B2 * | 9/2005 | Dybro | ................... | 74/471 XY |
| 2001/0000404 A1 * | 4/2001 | Losada | ....................... | 227/119 |
| 2001/0003708 A1 * | 6/2001 | Aizu et al. | ...................... | 463/7 |
| 2003/0073981 A1 * | 4/2003 | Whitman et al. | ............... | 606/1 |
| 2004/0060718 A1 * | 4/2004 | Izumisawa | .................. | 173/169 |
| 2004/0140112 A1 * | 7/2004 | Salminen et al. | .............. | 173/1 |
| 2004/0211573 A1 * | 10/2004 | Carrier et al. | .................. | 173/2 |
| 2006/0137888 A1 * | 6/2006 | Soika et al. | ................... | 173/48 |

(Continued)

*Primary Examiner*—Brian D Nash
(74) *Attorney, Agent, or Firm*—Harness, Dickey & Pierce, P.L.C.

(57) ABSTRACT

A power tool having a power tool body and a tool that is movably coupled to the power tool body. The power tool also includes a joystick control coupled to the power tool body, wherein the joystick control is operable as a user interface for affecting the operation of at least one function of the tool.

15 Claims, 1 Drawing Sheet

U.S. PATENT DOCUMENTS

2006/0142657 A1* 6/2006 Quaid et al. ............... 600/424
2006/0243469 A1* 11/2006 Webster ..................... 173/217
2007/0221701 A1* 9/2007 Ortiz et al. ............... 227/175.1
2008/0189870 A1* 8/2008 Dayton et al. ................ 71/167

* cited by examiner

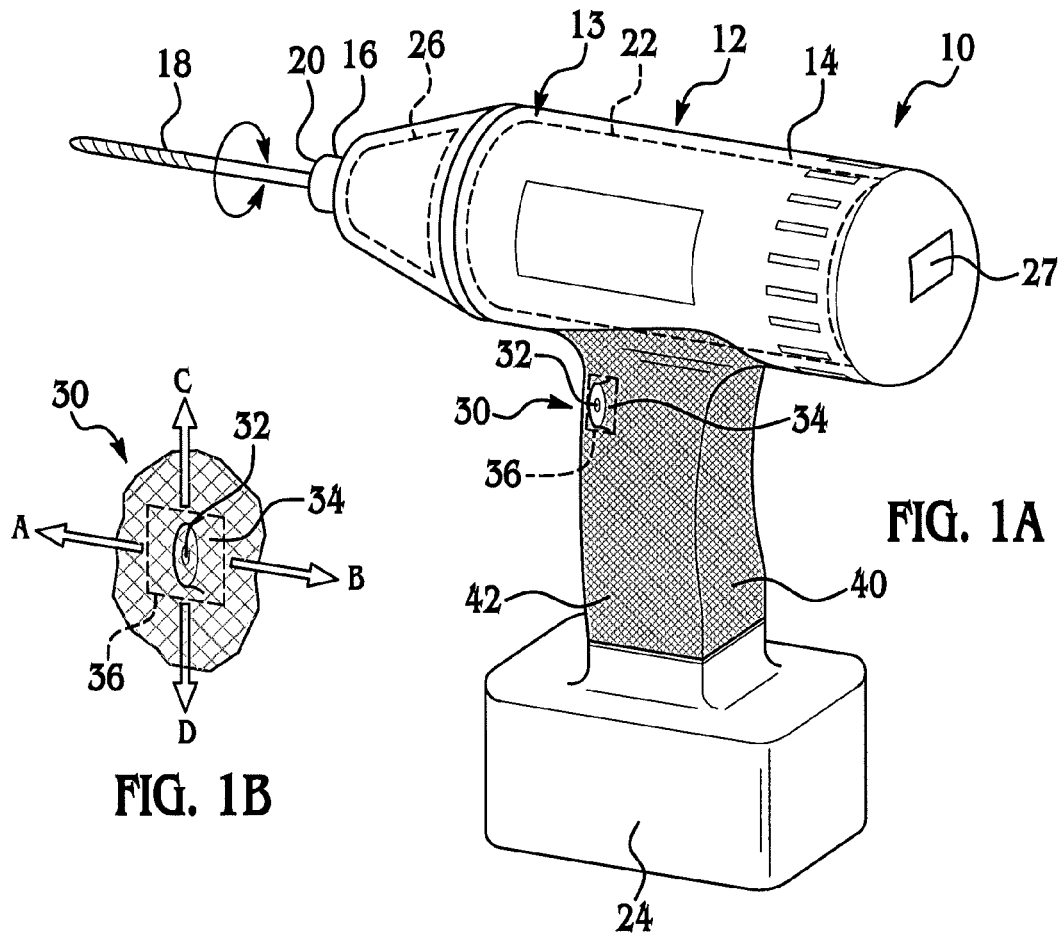
FIG. 1A
FIG. 1B
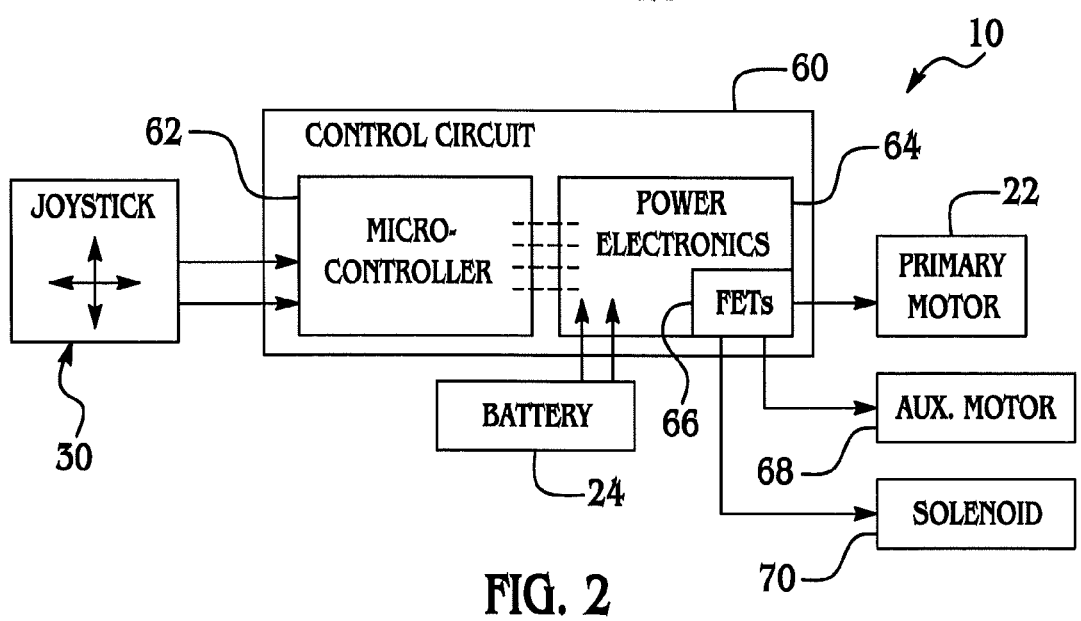
FIG. 2

POWER TOOL HAVING A JOYSTICK CONTROL

CROSS-REFERENCE TO RELATED APPLICATIONS

This application claims the benefit of U.S. Provisional Application No. 60/820,351, filed Jul. 26, 2006, the disclosure of which is incorporated herein by reference.

FIELD

The following relates to a power tool and, more particularly, to a power tool having a joystick control.

BACKGROUND

The statements in this section merely provide background information related to the present disclosure and may not constitute prior art.

It is known to provide a power tool with switches, knobs, and other controls. For instance, a power drill typically includes a trigger that the user actuates to cause rotation of the tool held in the chuck. Power drills also typically include a forward/reverse selector switch located near the trigger that a user actuates to change the rotation direction of the tool. Some power drills also include a clutch control (e.g., a dial) that is used to change the clutch setting of the drill such that the amount of resistance necessary to stop rotation of the chuck can be changed.

However, the conventional controls included on power tools suffer from certain disadvantages. For instance, the conventional controls can be awkward to manipulate, especially while holding and supporting the power tool. Moreover, these power tools can include several separate controls, and as such, the controls may take up substantial space on the power tool.

SUMMARY

A power tool is disclosed that has a power tool body and a tool that is movably coupled to the power tool body. The power tool also includes a joystick control coupled to the power tool body, wherein the joystick control is operable as a user interface for affecting the operation of various functions of the tool.

In addition, a portable power drill is disclosed that includes a body, a tool that is movably coupled to the body, and a controller. The power drill also includes a joystick control coupled to the power tool body, wherein manipulation of the joystick control supplies input signals to a controller for controlling various operating functions of the tool.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1A is a perspective view of one embodiment of a power tool with a joystick control;

FIG. 1B is a perspective detail view of the joystick control; and

FIG. 2 is a block diagram of the control circuit of the power tool of FIG. 1A.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring initially to FIG. 1A a power tool 10 is illustrated. In the embodiment shown, the power tool 10 is a portable power drill 12. However, it will be appreciated that the power tool 10 could be of any suitable type without departing from the scope of the present disclosure.

The power drill 12 generally includes a body 13 and a tool 18 that is moveably coupled to the body 13. The body 13 of the power drill 12 includes a housing 14 and a chuck 16. In this embodiment, the tool 18 is removably coupled to the body 13 via the chuck 16. The chuck 16 includes a lock/release mechanism 20 for selectively locking the tool 18 in the chuck 16 and releasing the tool 18 therefrom. In the embodiment shown, the tool 18 is a drill bit; however, it will be appreciated that the tool 18 could be of any suitable type (e.g., a screwdriver head) without departing from the scope of the present disclosure.

The power drill 12 also includes a motor 22, schematically shown in FIGS. 1A and 2. The motor 22 is enclosed within the housing 14. The motor 22 can be of any suitable type. Additionally, the power drill 12 includes a power source 24 for supplying power to the motor 22. In the embodiment shown, the power source 24 is a battery such that the power drill 12 is of a cordless type. However, it will be appreciated that the power drill 12 could include a cord for electrical attachment to a wall outlet without departing from the scope of the present disclosure. When power is supplied from the power source 24 to the motor 22, the motor 22 is able to rotate the tool 18. In one embodiment, the motor 22 is able to rotate the tool 18 in either direction about the axis of the tool 18. Furthermore, in one embodiment, the motor 22 is able to rotate the tool 18 at variable speeds.

Furthermore, the power drill 12 includes a clutch mechanism 26 schematically shown in FIG. 1A. The clutch mechanism 26 is of a known type. It is known that the tool 18 can experience resistance to rotation during operation. For instance, when drilling a hole, the material being drilled will exert a resistance force in the direction opposite to the direction of rotation of the tool 18. The amount of resistance can vary depending on the material being cut, etc. The clutch mechanism 26 limits the torque output of the tool 18 by stopping rotation of the chuck 16 when the output torque required to rotate the chuck exceeds a selected amount. As such, the clutch mechanism 26 protects the user, the tool 18, and/or the workpiece.

The clutch mechanism 26 has a plurality of clutch settings. Each clutch setting corresponds to a different predetermined torque level at which power delivery to the chuck 16 is interrupted. Thus, at a low level clutch setting, power delivery to the chuck 16 is interrupted when the tool 18 experiences a low level of resistance, and at a high level clutch setting, power delivery to the chuck 16 is not interrupted until the tool 18 experiences a high level of resistance.

In the embodiment shown, the power drill 12 also includes an indicator 27 operable for indicating the current clutch setting of the clutch mechanism 26. For instance, in one embodiment, the indicator 27 includes at least one LED that indicates the current clutch setting of the clutch mechanism 26 (e.g., 1 to 10).

In addition, the power tool 10 includes a joystick control 30 coupled to the body 13. The joystick control 30 includes a stick member 32 and a cover member 34. The stick member 32 at least partially protrudes from an opening 36 in the housing 14, and the cover member 34 extends over the opening to thereby cover the stick member 32. Thus, the cover member 34 and the housing cooperate to encapsulate the stick member 32. In one embodiment, the cover member 34 is made of a relatively thin membrane layer of elastomeric material. Also, in the embodiment shown, the cover member 34 is integral with a handgrip of the power drill 12.

The stick member 32 of the joystick control 30 is movable relative to the housing 14 such that a user can move and manipulate the stick member 32. As shown in the embodiment of FIG. 1B, the stick member 32 is movable along two perpendicular axes, namely, an A-B axis (i.e., a horizontal axis) and a C-D axis (i.e., a vertical axis).

As will be described below, manipulation of the stick member 32 along one or more of these axes allows a user to control a selected operating function of the power drill 12. It will be appreciated that the joystick control 30 could be configured to provide any suitable control function without departing from the scope of the disclosure. In one embodiment, the joystick control 30 is multifunctional, and the joystick control 30 is the primary or only control input device on the power drill 12. In another embodiment, the joystick control 30 is provided in addition to other input control devices, such as a trigger switch, a clutch control, or a forward/reverse switch.

In one embodiment, the joystick control 30 can be used to control rotation of the motor 22 in a first direction or in a second opposite direction, to change the clutch setting of the clutch mechanism 26, and to lock and release the tool 18 from the chuck 16. In another embodiment in which the power tool 10 includes a transmission, the joystick control 30 is used to control the transmission (e.g., for changing between a high speed output and a low speed output).

More specifically, in one embodiment, manipulation of the stick member 32 in the A-direction causes power to be delivered to the motor 22 such that the chuck 16 is driven in a clockwise direction. Also, manipulation of the stick member 32 in the B-direction causes power to be delivered to the motor 22 such that the chuck 16 is driven in a counterclockwise direction. Furthermore, manipulation of the stick member 32 in the C-direction changes the clutch mechanism 26 to a higher level torque setting, and manipulation of the stick member 32 in the D-direction changes the clutch mechanism 26 to a lower level torque setting. It will be appreciated that these and other functions could be effectuated by moving the joystick control 30 in any suitable direction or combination of directions.

Furthermore, in one embodiment, the joystick control 30 is an analog joystick control such that incremental movement of the joystick control 30 produces variable changes in an output signal from the joystick control 30. As such, movement of the stick member 32 a small distance in the A-direction causes the tool 18 to be driven at a relatively slow speed, and further movement of the stick member 32 in the A-direction increases the speed of the tool 18 in the same direction. Accordingly, the joystick control 30 provides the variable speed control functionality of a conventional trigger switch.

Additionally, in one embodiment, the joystick control 30 is programmable. As such, a user can program a unique manipulation sequence for the joystick control 30, which correlates to a desired function. Once the manipulation sequence is programmed, and the user manipulates the joystick control 30 according to the manipulation sequence, the joystick control 30 outputs a signal that correlates to the desired function. It will be appreciated that the joystick control 30 could be programmed with any suitable manipulation sequence and could be programmed for effectuating any suitable function.

More specifically, if a user desires the power drill 12 to have an automatic tool release function, the user can program a manipulation sequence (e.g., two quick successive and alternating movements of the stick member 32 in the A-direction and the B-direction). After such programming, manipulation of the stick member 32 according to this programmed sequence will cause the lock/release mechanism 20 of the chuck 16 to automatically release the tool 18 from the body 13 of the power drill 12.

In the embodiment shown, the joystick control 30 is provided on and coupled to a hand grip portion 40 of the body 13. More specifically, the joystick control 30 is provided at an upper end of a transverse side 42 of the hand grip portion 40. Thus, when a user grips and holds the power drill 12 with a hand, the joystick control 30 is substantially located beneath the index or other finger of that hand. As such, the user can hold and support the power drill 12 with one hand and simultaneously manipulate the joystick control with the index finger or other finger of the same hand. Accordingly, the joystick control 30 is conveniently located for one handed use of the power drill 12.

It will be appreciated that the joystick control 30 is relatively compact. Accordingly, there is increased surface area on the power drill 12 for gripping and supporting the power drill for improved ergonomics and control of the power drill 12.

Referring now to FIG. 2, an electrical block diagram of the control circuit for the power tool 10 and joystick control 30 is illustrated. As shown in FIG. 2, the power tool 10 includes a control circuit 60 that is in electrical communication with the joystick control 30, the power source 24, and the primary motor 22. The control circuit 60 includes a low voltage microcontroller portion 62 with logic level circuitry and a power electronics portion 64. The power electronics portion includes one or more field effect transistors (FET) 66 controlling the application of power to the primary motor 22 as well as to one or more smaller, auxiliary motors 68 or solenoid devices 70 for controlling the actuation or manipulation of various components of the tool 18, such as the chuck 16 or the clutch mechanism 26.

When the joystick control 30 is manipulated, the joystick control 30 outputs logic signals corresponding to the direction, amount of displacement, etc. of the stick member 32. These logic signals are received by the low voltage controller portion 62, which processes the signals and produces appropriate output control signals to the power electronics portion 64 to control the application of power from the power source 24 to the motor 22 and other auxiliary actuation devices 68 or solenoids 70 in accordance with the various inputs provided by the user via the joystick control 30.

In summary, the joystick control 30 provides a convenient user input interface for a power tool 10. The joystick control 30 is also relatively compact and allows the power tool 10 to be ergonomically designed for convenient operation with a single hand. Furthermore, the joystick control 30 is a relatively inexpensive input device. Moreover, the joystick control 30 can effectuate multiple functions for added utility.

The invention has been described in an illustrative manner. It is to be understood that the terminology which has been used is intended to be in the nature of words of description rather than of limitation. Many modifications and variations are possible in light of the above teachings. Therefore, within the scope of the appended claims, the invention may be practiced other than as specifically described.

What is claimed is:

1. A portable, hand-held power tool comprising:
a power tool body having a handle portion adapted to be grasped by a hand of a user to support the power tool during use;
a tool that is movably coupled to the power tool body; and
a multi-axis joystick control coupled to the handle portion of the power tool body or to a portion of the power tool body adjacent to said handle portion, the joystick control comprising a multi-axis device that can be manipulated along first and second orthogonal axes, wherein the joystick control is operable as a user interface for affecting different operating functions of the power tool;
the joystick control affecting the operation of a first function of the power tool when manipulated along said first axis and affecting the operation of a second function of the power tool when manipulated along said second axis.

2. The power tool of claim 1, wherein the joystick control is an analog joystick control.

3. The power tool of claim 1, wherein the joystick control comprises a stick member, wherein the power tool body comprises an opening from which the stick member at least partially protrudes, and further comprising a cover member that extends over the opening to thereby completely cover the stick member.

4. The power tool of claim 1, wherein manipulation of the joystick control moves the tool relative to the power tool body.

5. The power tool of claim 1, wherein manipulation of the joystick control changes a rotation direction of the tool.

6. The power tool of claim 1, wherein manipulation of the joystick control varies a speed setting of the tool.

7. The power tool of claim 1, wherein the joystick control is programmable to thereby allow a user to program a manipulation sequence for the joystick control such that manipulating the joystick control according to the manipulation sequence causes a desired function.

8. The power tool of claim 1, further comprising a control circuit, and wherein manipulation of the joystick control supplies input signals to the control circuit for affecting the different operating functions of the power tool.

9. The power tool of claim 8, further comprising a motor and a power source, and wherein the control circuit comprises:
a low voltage portion that receives the logic level analog signal from the joystick control; and
a power electronics portion that is in communication with the low voltage portion and that communicates with the power source to supply a required voltage and current from the power source to the motor.

10. The power tool of claim 8, wherein the power tool comprises a portable, hand-held power drill.

11. The power tool of claim 1, further comprising a control circuit in electrical communication with the joystick control for receiving a signal from the joystick control, wherein the control circuit includes at least one relay.

12. The power tool of claim 1 wherein the handle portion is fixedly joined to the power tool body.

13. A portable, hand-held power tool comprising:
a power tool body having a handle portion adapted to be grasped by a hand of a user to support the power tool during use;
a tool that is movably coupled to the power tool body;
a clutch mechanism having a plurality of clutch settings, wherein for each of the plurality of clutch settings, a different amount of resistance on the tool stops power delivery to the tool;
a multi-axis joystick control coupled to the handle portion of the power tool body or to a portion of the power tool body adjacent to said handle portion, wherein the joystick control is operable as a user interface for affecting the operation of at least one function of the power tool, and further
wherein manipulation of the joystick control changes between the plurality of clutch settings.

14. The power tool of claim 13, further comprising an indicator operable for indicating which of the plurality of clutch settings at which the clutch mechanism is set.

15. A portable, hand-held power tool comprising:
a power tool body having a handle portion adapted to be grasped by a hand of a user to support the power tool during use;
a tool that is movably coupled to the power tool body;
a chuck for selectively locking onto and releasing the tool;
a multi-axis joystick control coupled to the handle portion of the power tool body or to a portion of the power tool body adjacent to said handle portion, wherein the joystick control is operable as a user interface for affecting the operation of at least one function of the power tool; and further
wherein manipulation of the joystick control causes the chuck to release the tool.

* * * * *